United States Patent [19]
Hansbauer

[11] Patent Number: 4,734,567
[45] Date of Patent: Mar. 29, 1988

[54] LOCKING AND UNLOCKING DEVICE FOR A CARD READER

[75] Inventor: Hermann Hansbauer, Munich, Fed. Rep. of Germany

[73] Assignee: Siemens Aktiengesellschaft, Berlin and Munich, Fed. Rep. of Germany

[21] Appl. No.: 897,438

[22] Filed: Aug. 18, 1986

[30] Foreign Application Priority Data

Sep. 18, 1985 [DE] Fed. Rep. of Germany ....... 3533301

[51] Int. Cl.⁴ ............................................. G06K 13/00
[52] U.S. Cl. .................................... 235/482; 235/485; 235/486
[58] Field of Search .................... 235/482, 485, 486

[56] References Cited
U.S. PATENT DOCUMENTS 3,866,827  2/1975  Obata et al. ........................ 235/482

FOREIGN PATENT DOCUMENTS 3343727  6/1985  Fed. Rep. of Germany .

Primary Examiner—Harold I. Pitts
Attorney, Agent, or Firm—Mark H. Jay

[57] ABSTRACT

A card reader locking and unlocking apparatus has a locking lever. One end of the locking lever supports a hook which hooks over a card when the card is locked in position during reading. A key, when brought into abutment with the locking lever, raises the locking lever so that the hook clears the trailing edge of the card and permits the card to be withdrawn. A solenoid acts on the locking lever by a release lever to electrically lock and unlock the card. The release lever is forked so that movement of the locking lever by the key does not cause corresponding movement of the solenoid armature.

3 Claims, 3 Drawing Figures

LOCKING AND UNLOCKING DEVICE FOR A CARD READER

BACKGROUND OF THE INVENTION

The invention relates to a locking and unlocking device for a card reader of the type in which the card is entered into the card reader through an entry slot and ejected by spring force. More specifically, the invention relates to a locking and unlocking device in which an at least partially closed hook of a locking element projects into the card entry slot in the quiescent condition, whereby the end of the card is hooked by the hook while the card is being read and the card may be removed from the entry slot by means of a key acting upon the locking element through a lever mechanism.

Numerous designs for these types of card readers are known. The card is normally placed on a longitudinally slideable entry tray and carried to an evaluating device. In order to read the card accurately, the card must be precisely positioned within the card reader while being read. This has been achieved through the action of a mechanical cam or by electromechanical means.

German Offenlegungsschrift P No. 33 43 727 shows a card reader in which the card receptor is a drawer that is insertable into an opening in a telephone station, and that is carried to, and is held within, a trough area in the bottom of the unit. In the inserted state of the card receptor, a projection on a lever, actuated through the entry, engages the housing wall within the opening in the telephone station and thereby arrests the card receptor in the read position. The lever thereby projects minimally beyond the outer contours of the telephone station, so that upon completion of the read procedure the card receptor may be drawn from its locked position by downward pressure on the lever.

This card reader has the disadvantage that the card receptor must be drawn, at least partially, out of the telephone station in order to insert and/or remove the card. Aside from the difficulty of inserting and removing the card, this structure makes it possible that the contacts in the card receptor will become contaminated.

It is known to avoid this disadvantage through the use of a longitudinal slide which is movable within a fixed receptor. The slide, which supports the contact apparatus by which the card is read, is mechanically arrested in the read position by a cam or by an electromagnet. This has the disadvantage that the card projects so far out of the card reader in the read position, that it may be removed without unlocking of the slide. (This unlocking may follow, for example, during cam locking, due to renewed pressure on the card, and the resulting release of this spring loaded element.) The contact springs by which the card is read then slide over the sensitive reading area of the card. This eventually damages the card and makes it unusable.

It has therefore been proposed to fix the card in position during reading by using a pin to engage a mating hole in the card. This is undesirable because the card should be universally useable and not limited to use with a specific type of card reader.

It is also known to lock the card during reading by an over-riding hook of a locking lever, so that the card is not removable by the user.

In certain applications it may be desirable to return the card to the user automatically, e.g. after it has been read.

One object of the invention is to further improve existing locking and unlocking devices to make them more user-friendly.

SUMMARY OF THE INVENTION

In accordance with the invention, the key is supplemented by a solenoid, which acts upon the locking lever via a release lever. This has the advantage that existing locking and unlocking devices may be retrofitted to provide electrical actuation, without costly modifications.

In an advantageous embodiment, one end of the release lever is fixed to the solenoid armature and the other end is forked to engage the end of the locking lever that is opposite the hook which hooks over the free end of the card.

Advantageously, the fork of the release lever is dimensioned such that operation of the key does not move the release lever. In this way, locking of the moving parts can be held to a minimum. Also, the necessary force required to actuate the locking and unlocking device is substantially reduced.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
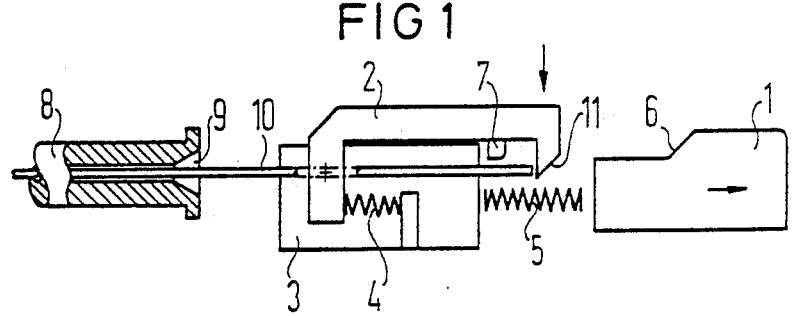
FIG. 1 shows a known card reader in the state in which a card is locked in place during reading.

A known card reader apparatus has a key 1 and a hinged locking lever 2. The lever 2 is supported on its side on a mounting base 3, and is biased by a compression spring 4. The key 1 is biased outwardly by an additional compression spring 5, and has a sloping ramp 6. The ramp 6, in use, moves a cam 7 which is arranged on the locking lever 2.

Figure 2:
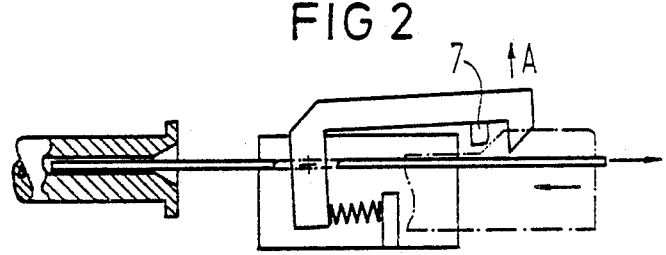
FIG. 2 shows the known card reader in the state in which a card is unlocked.

In the state shown in FIG. 1, the card 10 is inserted into the card reader 8 and is received by a moveable slide that is held, against spring pressure, within the card reader 8. When the card 10 has been fully inserted, it is locked in position by a hook 11 on the locking lever 2, which reaches over the rear end of the card 10. As shown in FIG. 2, when the key 1 is pushed in, its sloping ramp 6 lifts the cam 7, whereby the locking lever is lifted in the direction of the arrow A, whereby the card 10 is released and may be removed.

Figure 3:
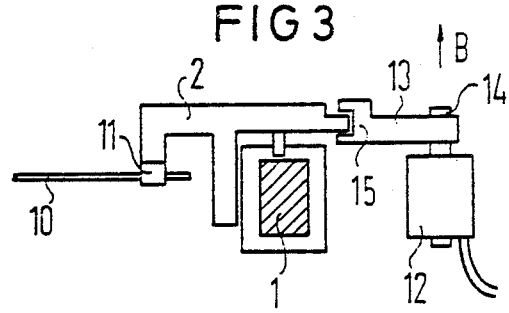
FIG. 3 shows a preferred embodiment of the invention.

Turning to FIG. 3, there is shown an arrangement for locking and unlocking the card 10 using a supplemental solenoid 12, in which the device is viewed in the direction of the slot 9 of the card reader 8. In addition to the key 1, there is provided a solenoid 12 which actuates the locking and unlocking device through a release lever 13. One end of the release lever 13 is secured to the moving armature 14 of the solenoid 12, while its other free end 15 is forked and engages one end of the locking lever 2. FIG. 3 shows the card 10 in the locked condition. When the solenoid 12 is actuated, its armature 14 moves in the direction of the arrow B, raising the hook 11 of the locking lever 2 sufficiently so that the card 10 is released.

The apparatus is so designed that when the locking lever 2 is lifted by the key 1, the armature 14 of the solenoid 12 is not moved. This is because the fork at the free end 15 of the release lever 13 is chosen to have appropriate dimensions. When the card 10 is in the locked position during reading, the end of the locking lever 2 which is opposite the hook 11 rests on the bottom of the fork. When the key 1 is used to unlock the card 10, the free end 15 of the locking lever 2 is moved upwardly within the fork, but the fork has enough clearance so that this motion does not move the armature 14.

Those skilled in the art will understand that changes can be made in the preferred embodiments here described, and that these embodiments can be used for other purposes. Such changes and uses are within the scope of the invention, which is limited only by the claims which follow.

What is claimed is:

1. A device for locking and unlocking a card which is introduced into a card reader, comprising:
   a locking lever;
   a hook mounted to one end of the locking lever and being so positioned that when the card is inserted into the card reader in a read position, the hook hooks over a trailing edge of the card;
   a key mounted such that it may be brought into abutting relationship with the locking lever and, when abutting therewith, causing the locking lever to be sufficiently raised as to unhook the hook from the trailing edge of the card;
   a solenoid; and
   a release lever fixed to the solenoid and raising the locking lever upon actuation of the solenoid.

2. The device of claim 1, wherein one end of the release lever is fixed to an armature of the solenoid and another end is forked, said another end engaging the locking lever at a location remote from the hook.

3. The device of claim 2, wherein said another end is dimensioned such that when the locking lever is lifted by the key, movement of the locking lever occurs within the fork and the release lever is unmoved.

* * * * *